No. 781,484. PATENTED JAN. 31, 1905.
T. WRIGHT.
ROTARY INTERNAL COMBUSTION ENGINE.
APPLICATION FILED OCT. 13, 1902.
4 SHEETS—SHEET 1.
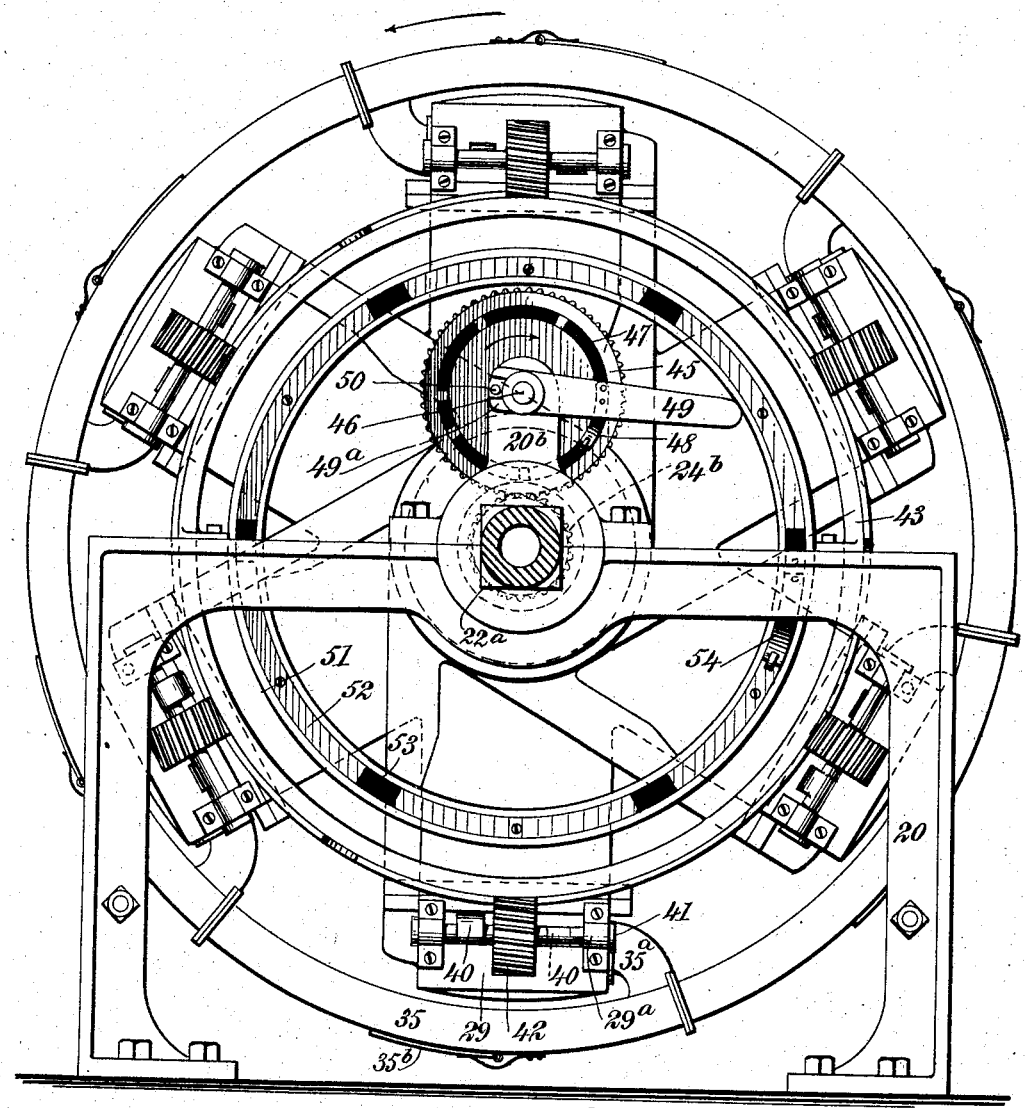
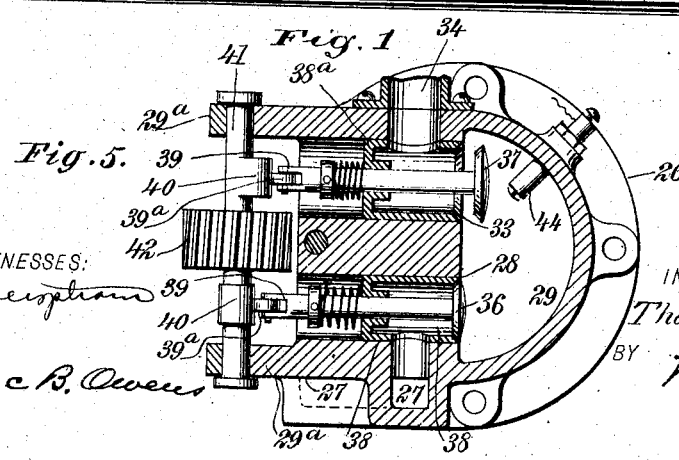
Fig. 1
Fig. 5.
WITNESSES:
INVENTOR
Thomas Wright
BY
ATTORNEYS.

No. 781,484.

PATENTED JAN. 31, 1905.

T. WRIGHT.
ROTARY INTERNAL COMBUSTION ENGINE.
APPLICATION FILED OCT. 13, 1902.

4 SHEETS—SHEET 2.

WITNESSES:
Joshua Bergstrom
Isaac B. Owens

INVENTOR
Thomas Wright
BY
ATTORNEYS

No. 781,484. PATENTED JAN. 31, 1905.
T. WRIGHT.
ROTARY INTERNAL COMBUSTION ENGINE.
APPLICATION FILED OCT. 13, 1902.
4 SHEETS—SHEET 3.
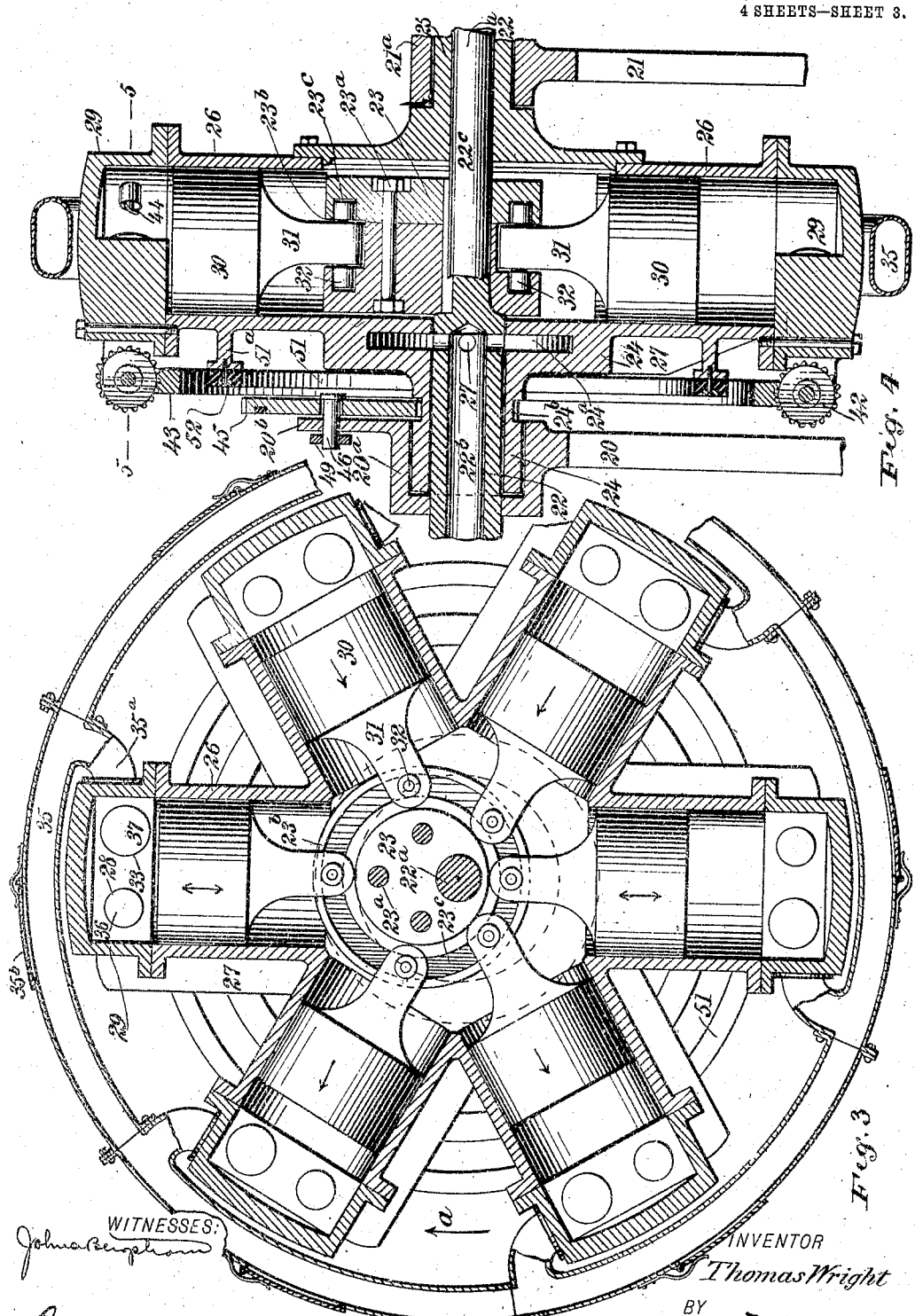

No. 781,484. PATENTED JAN. 31, 1905.
T. WRIGHT.
ROTARY INTERNAL COMBUSTION ENGINE.
APPLICATION FILED OCT. 13, 1902.
4 SHEETS—SHEET 4.
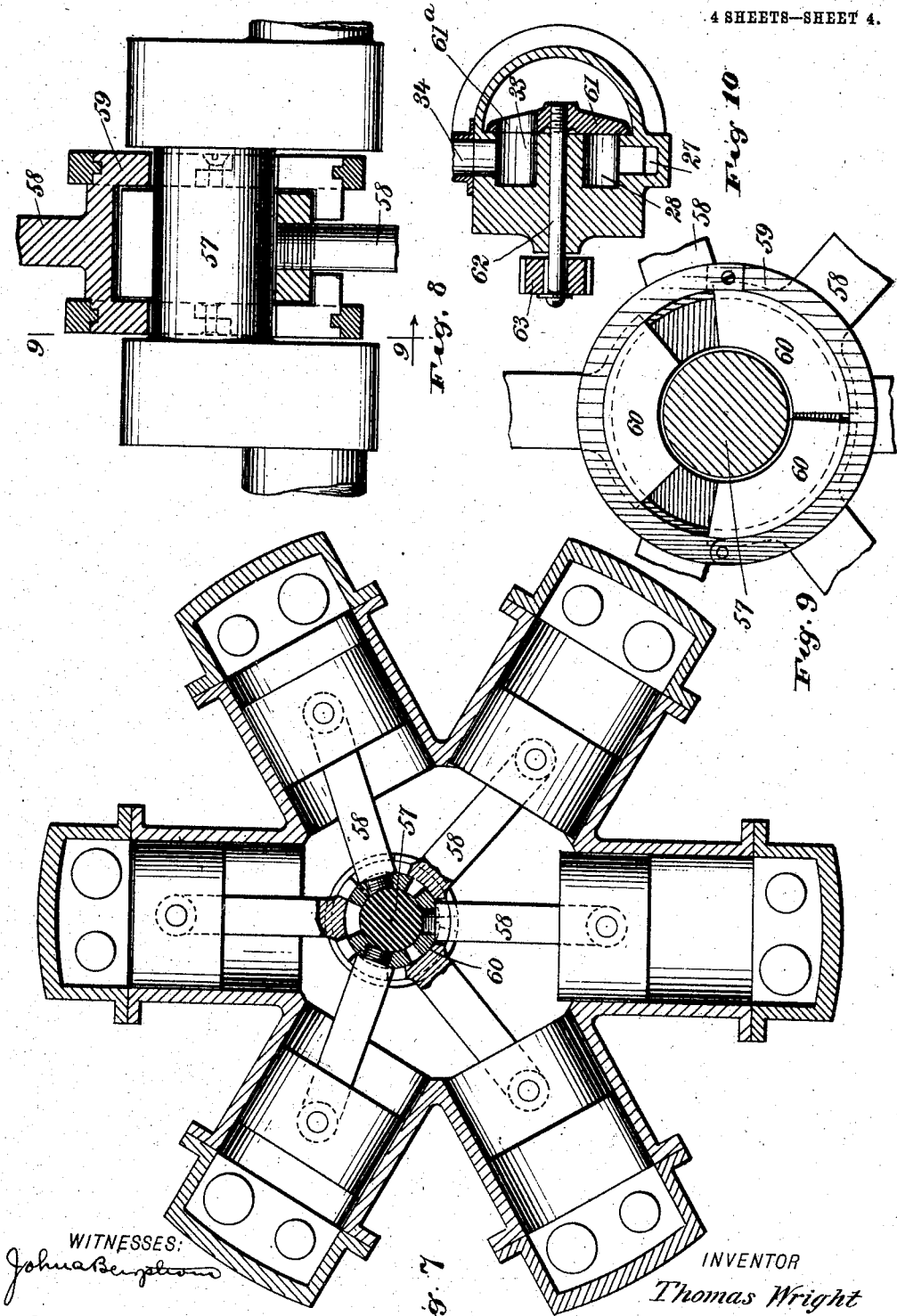
WITNESSES:
INVENTOR
Thomas Wright
BY
ATTORNEYS.

No. 781,484. Patented January 31, 1905.

UNITED STATES PATENT OFFICE.

THOMAS WRIGHT, OF JERSEY CITY, NEW JERSEY.

ROTARY INTERNAL-COMBUSTION ENGINE.

SPECIFICATION forming part of Letters Patent No. 781,484, dated January 31, 1905.

Application filed October 13, 1902. Serial No. 127,066.

*To all whom it may concern:*

Be it known that I, THOMAS WRIGHT, a citizen of the United States, and a resident of Jersey City, in the county of Hudson and State of New Jersey, have invented a new and Improved Rotary Internal-Combustion Engine, of which the following is a full, clear, and exact description.

This invention relates to that class of internal-combustion engines in which one or a plurality of cylinders and pistons are arranged to turn around a stationary crank-shaft, the piston-rods being connected to the crank and power being taken from the outer ends of the cylinders or from some part in connection with the cylinders.

The invention lies in certain peculiarities of construction and organization, all of which will be clearly pointed out hereinafter.

This specification is an exact description of several examples of my invention, while the claims define the actual scope thereof.

Reference is to be had to the accompanying drawings, forming a part of this specification, in which similar characters of reference indicate corresponding parts in all the views.

Figure 2:
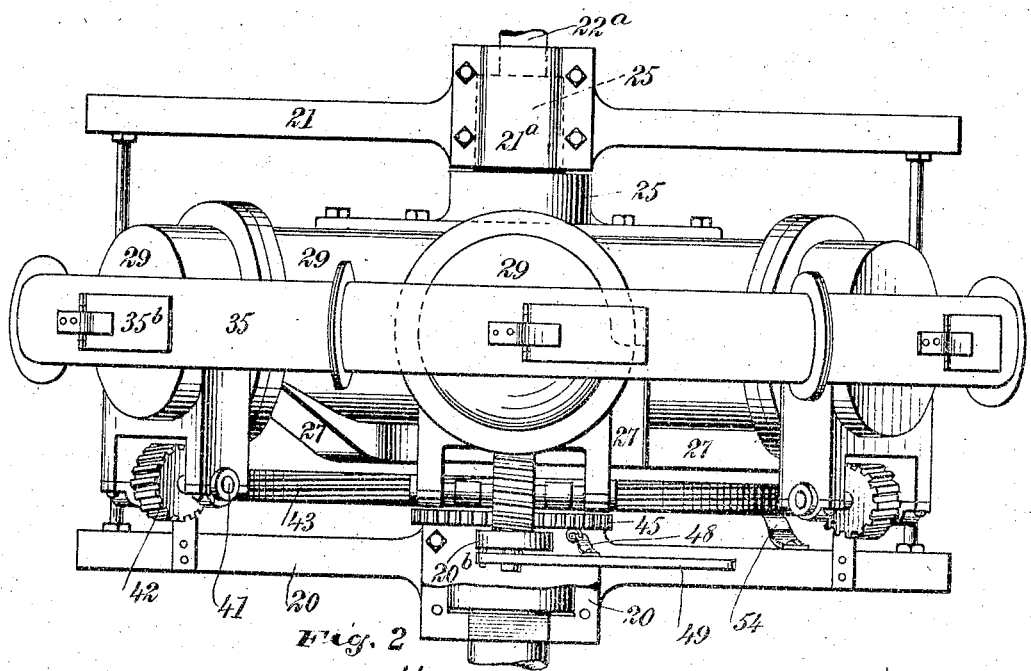
Figure 6:
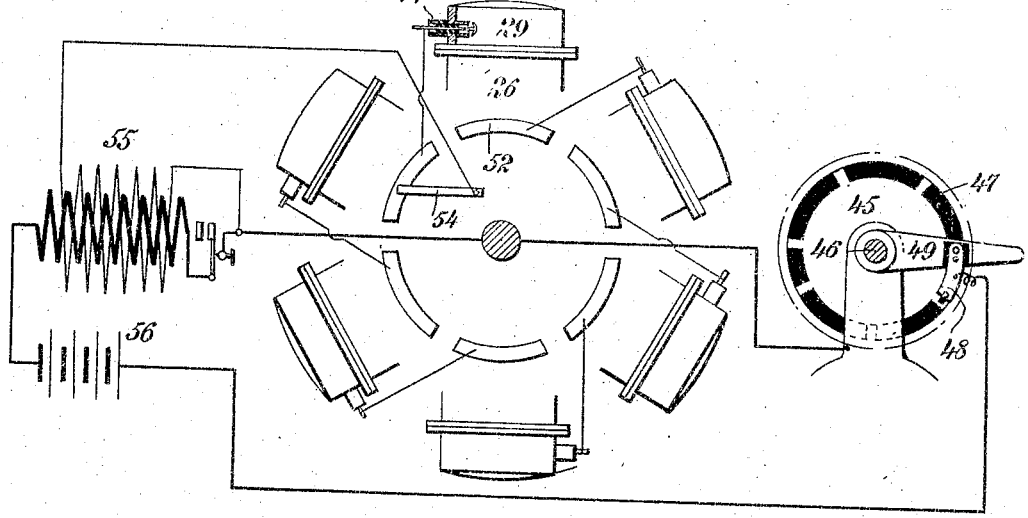
Figure 11:
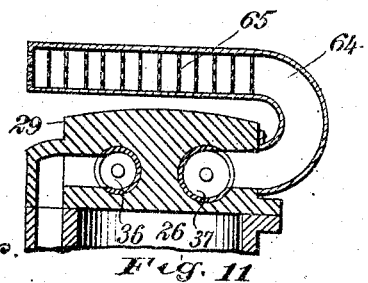

Figure 1 is a side elevation of the engine, showing particularly the gearing for the valves and part of the electric ignition devices. Fig. 2 is a plan view of the engine. Fig. 3 is a vertical section taken across the crank-shaft. Fig. 4 is a vertical section taken longitudinally of the crank-shaft. Fig. 5 is a section on the line 5 5 of Fig. 4, showing particularly the valves and the gear for operating them. Fig. 6 is a diagram illustrating the electric ignition system. Fig. 7 is a sectional view taken across the axis of the engine-shaft and showing an alternate construction at the crank thereof. Fig. 8 is an enlarged side view of the crank and its associated parts as shown in Fig. 7. Fig. 9 is a sectional elevation on the line 9 9 of Fig. 8. Fig. 10 is a sectional view of a modified form of valve, and Fig. 11 is a sectional view showing a different form of muffler.

Referring to Figs. 1 to 6, 20 and 21 indicate the two parts of the engine-frame, the part 20 having a box $20^a$ with an upward extension $20^b$ and the part 21 having a box $21^a$. In the box $20^a$ is mounted the part 22 of the engine-shaft, this part having a squared portion $22^a$ (see Fig. 1) fitted securely in the box to prevent the shaft part from turning. This part of the shaft is integral with or rigidly fastened to the shaft part $22^c$, located at the other side of the engine and passed through the center of the box $21^a$. On the shaft part $22^c$, between the boxes $20^a$ and $21^a$, is located the eccentric 23, which is preferably made up of two disk-like parts mounted eccentrically on the shaft and fastened together by bolts $23^a$. (See Fig. 4.) In the eccentric is formed a circumferential groove $23^b$, eccentric to the shaft and communicating at its sides with undercut portions $23^c$. Mounted loosely on the shaft-sections 22 and $22^c$ are the cylinder-hubs 24 and 25, which turn in the boxes $20^a$ and $21^a$, respectively. (See Fig. 4.) These hubs are suitably connected to the cylinders 26, which according to the construction illustrated are six in number. The shaft-section 22 has a passage $22^b$ therein, which leads the explosive mixture to the chamber $24^a$ in the hub 24. From this chamber a number of ducts 27 pass outward alongside of the respective cylinders to lead the mixture to the feed-ports 28, opening into the cylinder-heads 29, these heads forming the compression-chambers. (See upper part of Fig. 3.) 30 indicates the pistons, which have rigid rods 31, carrying laterally-disposed rollers 32 at their inner ends, these rollers running in the undercut portions $23^c$ of the groove $23^b$ in the eccentric 23. Assuming the pistons to be working according to the arrows applied thereto in Fig. 3, it will follow that through the action of the parts 31, 32, and 23 the group of cylinders will move bodily in the direction of the arrow $a$ around the engine-shaft. Fig. 5 shows the feed-port 28 and it also shows the exhaust-port 33, which port passes from the head 29 and opens into a lateral passage 34. These passages 34 communicate, respectively, with the branches $35^a$ of the muffler-drum 35. (See Fig. 3.) This drum according to the construction shown in Figs. 1 to 6 is in the form of a circular tube encircling the cylinders and turning therewith. It is preferably, though not necessarily, made up of sections, as illustrated, and is formed with an orifice near each cylinder, these orifices being commanded by outwardly-opening spring-seated flaps 35$^b$. The exhaust-gases are thus discharged into this drum, and when the pressure becomes sufficient one or more of the flaps 35$^b$ are opened and the gases pass into the atmosphere, but at such low pressure as to avoid any appreciable noise. 36 and 37 indicate, respectively, the feed and exhaust valves which seat against bushings 38 and 38$^a$ and open into the cylinder-heads 29. The stems 39 of the valves 36 and 37 pass through the bushings 38 and 38$^a$ and are spring-pressed normally to seat the valves. The outer ends of the stems 39 carry rollers 39$^a$, which bear against cams 40, these cams being two for each cylinder and carried in pairs on shafts 41. Said shafts are mounted in lugs 29$^a$, projecting from the cylinder-heads, and carry each a worm-gear 42, fixed to the shaft. These gears 42 are meshed with a large worm or spiral thread 43, supported in vertical position on and inside of the frame-section 20. As the cylinders turn in the operation of the engine the gears 42 are swept around the worm 43, and a rotary movement is imparted to the shafts 41. This operates the feed and exhaust valves properly to control the admission and exhaust of the engine.

Ignition is effected within the cylinder-heads 29. 44 indicates the spark-plugs or other form of igniter. Figs. 1 and 6 represent the preferred arrangement of the circuit devices if electric ignition be employed. On the hub 24 is formed a gear 24$^b$, and this is in mesh with a gear 45, mounted on a stub-shaft 46, carried fast in the extension 20$^b$ of the before-described box 20$^a$. The gear 45 is provided with an insulating-ring 47, broken in six places to correspond with the cylinders 26. On this ring 47 bears a central finger 48, which is carried by an arm 49, friction-tight on the shaft 46. Said arm has its short end forked, as indicated at 49$^a$, and a stud 50 on the extension 20$^b$ bears within the fork. This allows the arm movement on the shaft 46 within the limits of the fork.

51 indicates an insulating-ring held to the cylinders to turn therewith by brackets 51$^a$. This ring 51 carries a metallic ring 52, broken into sections corresponding to the cylinders by blocks of insulation 53. On this ring bears a contact-finger 54, fastened on and in electrical connection with the engine-frame.

Referring now to Fig. 6, the primary element of the spark-coil 55 is wired to the contact 48, such connection containing a battery 56, the gear 45 being in electrical connection with the engine-frame. The secondary element of the spark-coil is wired to the engine-frame and to the contact 54. One contact of each spark-plug is in electrical connection with the engine-frame, and the other contacts are wired, respectively, to the sections of the ring 52. The parts 45 and 52 turn in unison with the engine. As the finger 48 contacts with the wheel 45 the primary circuit is closed and a current is induced in the secondary circuit. By the action of parts 52 and 54 this secondary current is sent to the proper spark-plug. The period of ignition may be controlled by manipulating the lever 49, thus sending the spark at the exact time desired.

The organized operation of the engine as above described may be traced as follows: The passage 22$^b$ being placed in communication with the source of a combustible mixture, this will by the action of the valves 36 be admitted into the cylinders successively. As the pistons turn the charge is successively compressed, ignited, and exhausted, the engine, as here shown, operating under the four-cycle principle and each piston being at different work at all times. After the engine is "turned over" the action of the pistons on the eccentric will cause the cylinders to turn continuously around the shaft, as before described.

The varied construction shown in Figs. 7 to 9 consists in the substitution of a double crank 57 (see Fig. 8) for the eccentric 23, before described, and in pivotally connecting the piston-rods 58 (see Fig. 7) to the pistons. Three of the piston-rods 58, taken alternately, are fastened rigidly to a sectional collar 59, which is mounted loose on the wrist-pin of the crank 57, and the remaining three rods 58 are extended loosely into the said collar 59 and fastened to segmental shoes 60, which are confined by the collar, but free to slide on the wrist-pin of the crank around the center thereof. This construction operates the same as that before described, and either may be used at will.

Fig. 10 shows a modification in the valve devices in which a single rotary valve 61 is employed for both the feed and exhaust ports. This valve has an orifice 61$^a$, which is made alternately to register with the ports 28 and 33, and the valve is attached to a rotating stem 62, carrying a pinion 63 at its outer end. Said pinion 63 rolls over a large stationary spur, (not shown,) taking the place of the worm 43.

Fig. 11 shows a modification of the muffler in which a single drum 64 is applied to each cylinder. Said drums are fitted with perforated disks 65 and may be made to discharge in the reverse direction to that in which the engine normally turns, so that the force of the escaping gases will to some extent assist the movement of the engine.

Various other changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. In an internal-combustion engine, the combination of a stationary shaft, a group of cylinders mounted to move around the center thereof, pistons in the cylinders eccentric connections between the pistons and shaft, means for controlling and igniting the cylinder charges, a continuous annular drum extending around and inclosing the outer ends of the cylinders, a plurality of spring-seated closures commanding exhaust-openings from the drum, and connections passing laterally from the ends of the cylinders to the drum.

2. In an engine, the combination of a stationary shaft, a cylinder extending radially therefrom and arranged to swing around the same, a member carried rigidly by the shaft and having an eccentric groove therein, a piston mounted in the cylinder, a piston-rod, a laterally-extending part carried by the rod and running in said groove, for the purpose specified, and means for controlling the inlet and exhaust of the motive agent.

3. In an engine, the combination of a stationary shaft, a cylinder extending radially thereof, cylinder-hubs attached to the cylinder and fitted loosely around the shaft, a member carried rigidly by the shaft between said cylinder-hubs, said member having an eccentric groove therein, a piston, a piston-rod having a lateral part running in said groove, and means for controlling the inlet and exhaust of the motive fluid.

4. In the engine, the combination of a stationary shaft, a cylinder extending radially therefrom, cylinder-hubs attached to the cylinder and fitted loosely on the shaft, a stationary member carried eccentrically by the shaft and running between the cylinder-hubs, said member having a circumferential groove with undercut portions at each side thereof, a piston, a piston-rod having laterally extending parts respectively running in the undercut portions of the groove in the eccentric member, and means for controlling the inlet and exhaust of the motive fluid.

5. In an engine, the combination of two cylinder-hubs having trunnions thereon, means for revolubly mounting the cylinder-hubs through the medium of the trunnions, a stationary shaft extending loosely through the trunnions of the cylinder-hubs, said shaft having a passage therein and one of the cylinder-hubs having a chamber communicating with the passage in the shaft, a cylinder attached to the cylinder-hubs and having a duct or passage communicating with the said chamber in one of the cylinder-hubs, a feed-valve commanding said duct, an exhaust-valve, means for operating the valves, a piston in the cylinder, a piston-rod, and means effecting an eccentric connection between the stationary shaft and the piston-rod at a point between the cylinder-hubs.

In testimony whereof I have signed my name to this specification in the presence of two subscribing witnesses.

THOMAS WRIGHT.

Witnesses:
 Isaac B. Owens,
 Jno. M. Ritter.